UNITED STATES PATENT OFFICE.

HERBERT C. GORE, OF TAKOMA PARK, MARYLAND.

PROCESS FOR PRESERVING FRUIT-JUICES.

1,284,187. Specification of Letters Patent. Patented Nov. 5, 1918.

No Drawing. Application filed July 17, 1915. Serial No. 40,502.

(DEDICATED TO THE PUBLIC.)

*To all whom it may concern:*

Be it known that I, HERBERT C. GORE, a citizen of the United States, and an employee of the Department of Agriculture of the United States of America, residing at Takoma Park, in the State of Maryland, (whose post office address is Takoma Park, Maryland,) have invented a new and useful Process for Preserving Fruit-Juices.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

The object of my invention is to provide a process for treating fruit juices, whereby the foreign taste which certain fruit juices acquire upon sterilization by heating, and upon keeping after sterilization, may be removed or entirely avoided, and, in addition, to effect the removal of substances present in certain fruit juices, which coagulate, or have a tendency to coagulate, upon sterilization, or upon keeping after sterilization.

For accomplishing these objects, I treat the fruit juices with absorbent black of animal, mineral or vegetable origin, such as ebonite, norite, powdered bone black, lamp black, and charcoal, in such a way as to effect the removal of the substance or substances which cause the juices to acquire flavors, upon heating, and upon keeping after sterilization, foreign to the fresh juice, and to effect the removal of the substances which coagulate upon heating by sterilization and upon keeping after sterilization.

In practising my process, I first filter the fruit juices to be treated, but this step is not primarily essential, as I find from experiments that unfiltered fruit juices will respond to the process hereinafter described with substantially the same results as filtered fruit juices. I then treat the filter juice with a small proportion, usually from one to three per cent., of absorbent black, preferably in the form of a powder. This mixture is allowed to stand in the cold for a period ranging from fifteen minutes to one-half an hour, in order for the reaction to complete itself, or for absorption to take place. When the reaction or absorption has taken place, I subject the mixture to filtration for effecting the separation of the juice from the absorbent black. Following this step, I sterilize the fruit juice by heating it in the usual well-known manner.

Where orange or lemon juice is treated in the manner above described, I find that it is advantageous to add orange or lemon flavor, in the respective cases, to the respective fruit juices, prior to sterilization, in order to restore the distinctive flavor of the respective fruits to the juices.

From experiments I have ascertained that it is highly desirable to filter all fruit juices before treating them with absorbent black, and that such filtration may be facilitated and more completely effected by previously adding a small proportion of infusorial earth to the fruit juices. I further find that it is necessary, at times, to add infusorial earth to the fruit juices after they have been treated with absorbent black, for the purpose of removing traces of the absorbent black from the juices, which otherwise would remain therein in finely suspended condition. By adding infusorial earth to the juices subsequent to treatment with absorbent black, and filtering the mixture, I find that it is possible to remove all traces of the absorbent black from the treated juices.

In practice I find that the process described, consisting essentially in the treatment of fruit juices with absorbent black, is particularly advantageous in the treatment of apple cider. Heretofore, it has been found impracticable to prepare apple cider in a sterilized condition because the cider acquires a cooked taste upon heating, thereby injuring the quality of the product. By treating apple cider with absorbent black, such as, for example, powdered bone black, and then sterilizing it, no cooked flavor is discernible in the finished product. In addition, I find that said process is advantageous in treating cider which has been concentrated by freezing to a thin syrupy liquid. This product, if sterilized, acquires a cooked flavor similar to unfrozen cider, which injures its quality. If, in freezing concentrated cider, the product is treated with absorbent black, as hereinbefore described, the product will no longer deteriorate in flavor upon heating.

This process is of much value when applied to lemon and orange juice. These juices, upon keeping after sterilizing, develop peculiar flavors which obscure the distinctive flavor natural to the fresh juices. By treating lemon and orange juices with absorbent black, in the way which I have hereinbefore described, these juices no longer deteriorate in flavor upon keeping after sterilizing.

Having thus described my invention, I claim:

A process for preserving fruit juice consisting in filtering the juice, treating the filtered juice with a suitable proportion of absorbent black, subjecting the mixture to filtration for effecting the separation of the absorbent black from the juice, then adding infusorial earth to the juice and subjecting said mixture to filtration for effecting complete separation of traces of absorbent black from the treated juice, and finally sterilizing the treated product, substantially as specified.

In testimony whereof, I affix my signature in the presence of two subscribing witnesses.

HERBERT C. GORE.

Witnesses:
    CHARLES W. BOYLE,
    THOMAS SHAW.